United States Patent Office 3,392,164
Patented July 9, 1968

3,392,164
MONOAZO DYESTUFFS
Hermann Wunderlich, Cologne-Mulheim, Germany, assignor to Farbenfabriken Bayer Aktiengesellschaft, Leverkusen, Germany, a corporation of Germany
No Drawing. Filed June 16, 1964, Ser. No. 375,662
Claims priority, application Germany, Oct. 4, 1963, F 40,913
10 Claims. (Cl. 260—158)

ABSTRACT OF THE DISCLOSURE

Monoazo dyestuffs of the formula

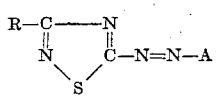

wherein R is lower alkyl, phenyl, or nitro phenyl; A is a 1-aryl-3-alkyl-pyrazolone-5 joined to the azo group in the 4-position or a 3-hydroxydiaryl amine joined to the azo group in the 4-position; the dyestuff being free of sulphonic acid and carboxylic acid groups. The dyestuffs of this invention are suitable for dyeing and printing synthetic fibers, especially nickel-, zinc-, copper-, and magnesium-modified polypropylene fibers.

---

The present invention concerns water-insoluble, metal-free azo dyestuffs of the general formula

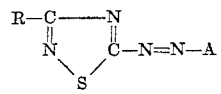

Herein A means the radical of a 1-aryl-3-alkyl-pyrazolone-5 linked in the 4-position, or the radical of a 3-hydroxydiaryl amine linked in the 4-position; R stands for an aromatic or aliphatic radical. The radicals A and R do not contain any sulphonic acid or carboxylic acid groups, but may otherwise contain any non-ionic substituents, such as hydroxyl, alkoxy, halogen, cyano, acylamino, alkyl, nitro, trifluoroalkyl, sulphofluoride, carboxylic acid ester, sulphonic and sulphonamide groups.

The new azo dyestuffs are produced by coupling a diazotized 5-amino-3-aryl or -alkyl-1,2,4-thiadiazole with a 1-aryl-3-alkyl pyrazolone-5 or a 3-hydroxy-diaryl amine each time in the 4-position, choosing the initial components in such a manner that the final dyestuff contains no sulphonic acid or carboxylic acid groups.

The starting components are coupled in an acid, neutral to weakly alkaline aqueous, an organic or organic-aqueous medium, and the dystuffs obtained which are hardly soluble or insoluble in water are separated by usual methods.

Suitable diazo components are, for example 5-amino-3-methylthiadiazole-1,2,4; 5-amino-3 - phenyl - thiadiazole-1,2,4- and 5-amino-3-(3'-nitrophenyl) - thiadiazole - 1,2,4 and the 5-amino-3-methyl-thiadiazol-1,2,4.

As azo components from the pyrazolone series there may be mentioned: 1 - phenyl-3 - methylpyrazolone - 5, 1-(2',5'-dichlorophenyl)-3-methylpyrazolone-5, 1-(4'-nitrophenyl)-3-methylpyrazolone-5 and from the 3-hydroxydiarylamine series: 3-hydroxydiphenylamine, 3-hydroxy-2'-methyldiphenylamine, 3-hydroxy - 4' - ethoxydiphenylamine and the like.

The new dyestuffs are excellently suitable for the dyeing and printing of synthetic fibres, especially nickel-, zinc-, copper- and magnesium-modified polypropylene fibres. These polypropylene fibres contain the aforesaid metals spun into them in form of phenolates, fatty acid salts, heterocyclic complexes, dialkyl-dithio-carbamates or inorganic salts or complex compounds. Since the dyestuffs are hardly soluble or insoluble in water dyeing is preferably carried out in the presence of dispersing compounds. In order to accelerate the dyeing, swelling agents may be added to the dyeing bath; dyeing can also be carried out at higher temperatures and in closed vessels, if desired.

The new dyestuffs are likewise useful for the dyeing of other hydrophobic textile materials, such as textiles made from aromatic polyesters, particularly polyethylene terephthalates and polyesters from terephthalic acid and 1,4-bis-hydroxymethyl cyclohexane, cellulose triacetate and superpolyamides. Dyeings with very good to excellent fastness properties are obtainable on those materials.

The following examples are given for the purpose of illustrating the invention. Parts given are parts by weight.

Example 1

2.7 parts of 5-amino-3-phenyl-thiadiazole-1,2,4 are dissolved in 35 parts of 90% phosphoric acid and treated with 4.6 parts of nitrosyl sulphuric acid at 0–5 C. After stirring the mixture for a further 4 hours at this temperature, a small amount of excess nitrite is removed with amido-sulphonic acid and a solution of 2.53 parts of 1-phenyl-3-methyl pyrazolone-5 in 20 parts of dilute hydrochloric acid is added dropwise at 0–5° C. within 10 minutes. Stirring is continued for a half hour and the reaction mixture is then poured on 300 parts of ice. It is then buffered with a dilute sodium hydroxide solution to a pH value of 5. The precipitated dyestuff has the constitution.

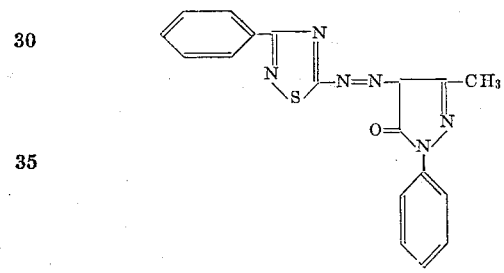

0.2 part of the dyestuff of the above formula are dispersed in 400 parts of water which contains as a dispersing agent 0.2 parts of 30% acetic acid and 0.2 part of a naphthalene sulphonic acid/formaldehyde condensation product. 10 parts of polypropylene fibre yarn are dyed herewith for one hour at biIling temperature. After a weakly alkaline after-treatment at 40–50° C. with 0.5 parts/litre of a commercial detergent followed by drying, an orange dyeing is obtained with very good fastness to solvents, rubbing, sublimation, wet processing, waste gas and light.

The polypropylene fibres used in the example contained, apart from other usual additives, nickel phenolate of bis-(alkylphenol)-monosulphides in concentrations of 0.5–1% spun, into them.

If, instead of the azo component of Example 1, the azo components of the following table are used, dyeings on these nickel-modified polypropylene fibres are obtained which likewise have very good general fastness properties.

| Azo component: | Shade on modified polypropylene fibre |
|---|---|
| 1-(3'-chlorophenyl)-3-methylpyrazolone-5 | Orange |
| 1-(2',5'-dichlorophenyl)-3-methylpyrazolone-5 | Orange |
| 1-(4'-nitrophenyl)-3-methylpyrazolone-5 | Orange |
| 1-(3'-sulphonamidophenyl)-3-methylpyrazolone-5 | Orange |

Example 2

A diazo solution prepared according to Example 1 from 2.7 parts of 5-amino-3-phenyl-thiadiazole-1,2,4 is combined with a solution of 2.7 parts of 3-hydroxy diphenyl amine in 30 parts of 60% sulphuric acid at —5° C. The reaction mixture is stirred for 30 minutes at —5° C. and is then poured on 300 g. of ice. It is then buffered with a dilute sodium hydroxide solution and ice to a pH of 5. The precipitated dyestuff has the following constitution.

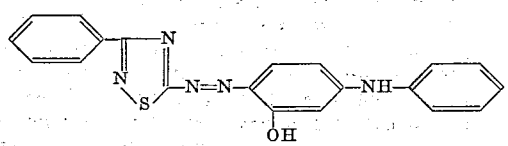

100 parts of polypropylene fibre material in the form of a combed material are dyed in 2000 parts of water which has been adjusted with dilute sulphuric acid to a pH of about 4–5 and, apart from 4 parts salicylic acid methyl ester, also contains 4 parts of a weakly anion-active alkylphenyl polyglycol ether sulphate, with one part of the finely dispersed dyestuff of the above constitution for one hour at 100° C.

The resulting violet dyeing is distinguished by very good fastness to wet processing, sublimation, solvents, waste gas and light.

Equally valuable violet dyeings on polypropylene fibres modified with nickel phenolates or zinc dithiocarbamates are obtained if the azo component of this example is replaced by 3-hydroxy-2'-methyldiphenyl amine, 3-hydroxy-4'-methyldiphenyl amine and by 3-hydroxy-4'-ethoxy-diphenyl amine.

Example 3

1.8 parts of 5-amino-3-methyl-thiadiazole-1,2,4 are dissolved in 30 parts of 90% phosphoric acid and diazotized within 4 hours with 4.6 parts of nitrosyl sulphuric acid at 0–5° C. After a small amount of excess nitrite has been destroyed a solution of 3.5 parts of 1-(2',5'-dichlorophenyl)-3-methylpyrazolone-5 in 30 parts of dilute hydrochloric acid is added dropwise at 0° C. The reaction mixture is stirred for 30 minutes, then poured onto 300 parts of ice and buffered with dilute soda lye to a pH value of 5.

The precipitated dyestuff has the formula

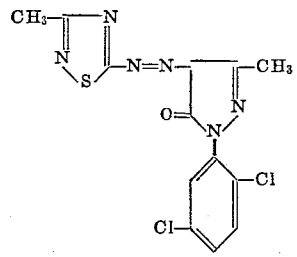

0.2 parts of this dyestuff are used according to the instructions of Example 1 for the dyeing of nickel-containing polypropylene fibres. A yellowish orange dyeing is obtained which exhibits very good fastness to solvents, rubbing, sublimation, wet processing and light.

If instead of the azo component of this example the azo components listed in the following table are used dyeings on nickel-modified polypropylene fibres are obtained which likewise possess very good general fastness properties.

| Azo component: | Shade on nickel-modified polypropylene fibres |
|---|---|
| 1-phenyl-3-methyl-pyrazolone-5 | Orange |
| 3-hydroxydiphenylamine | Violet |
| 3-hydroxy-4'-methyl-diphenylamine | Violet |

If 5-amino-3-(3'-nitrophenyl)-thiadiazole-1,2,4 is used as diazo component the dyestuff of the formula

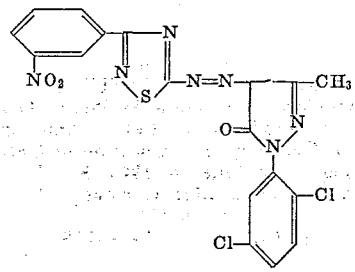

is obtained. It dyes polypropylene fibres which contain metal compounds, e.g. nickel phenolates, zinc- or nickel-dithiocarbamates, in combination with stabilizers spun into the fibres orange shades with excellent general fastness properties. The dyeing conditions correspond to those of Example 2.

I claim:
1. A monoazo dyestuff of the formula

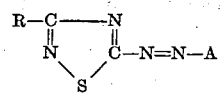

wherein R represents a member selected from the class consisting of lower alkyl, phenyl, and nitro phenyl, A stands for a member selected from the class consisting of (a)

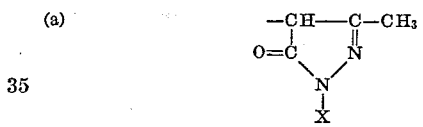

or (b)

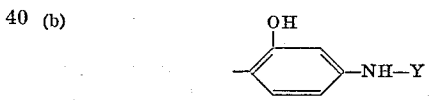

wherein X is phenyl or phenyl substituted with one or two substituents from the group consisting of chlorine, nitro, and sulfonamide; and Y is phenyl or phenyl substituted with methyl or ethoxy; the dyestuff being free of sulphonic acid and carboxylic acid groups.

2. The dystuff of the formula

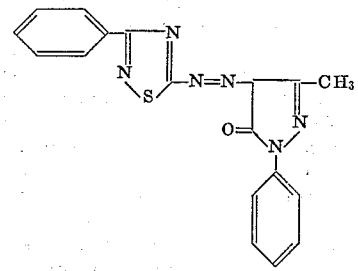

3. The dyestuff of the formula

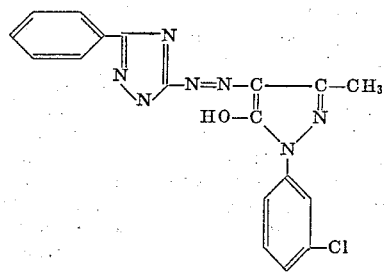

4. The dyestuff of the formula
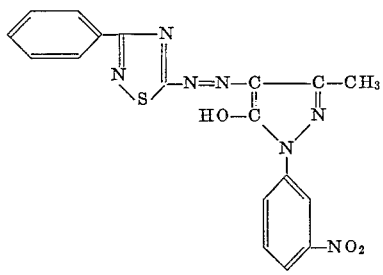
5. The dyestuff of the formula
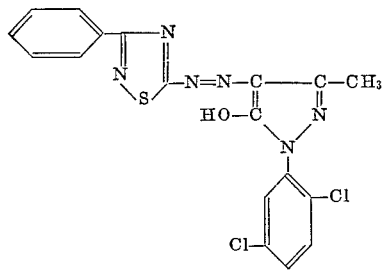
6. The dyestuff of the formula
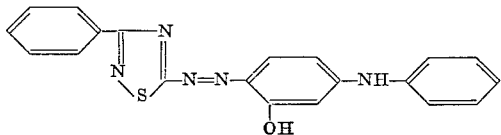
7. The dyestuff of the formula
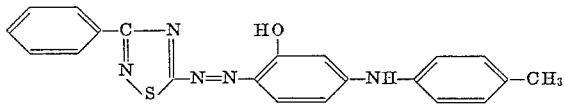
8. The dyestuff of the formula
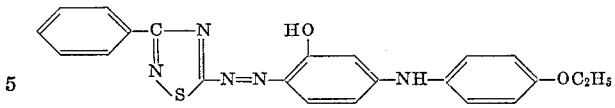
9. The dyestuff of the formula
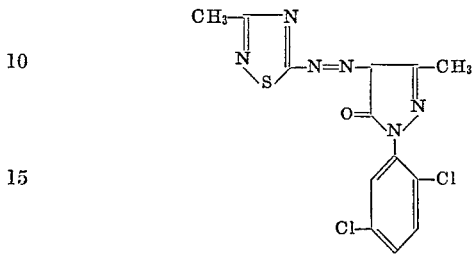
10. The dyestuff of the formula
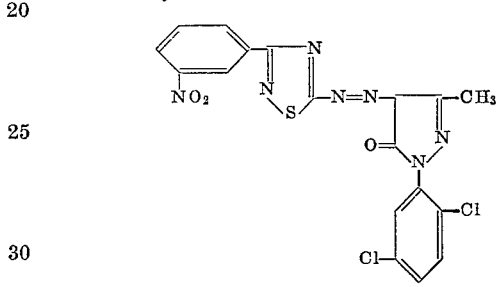
References Cited
UNITED STATES PATENTS
2,791,579  5/1957  Taube _____ 260—158
2,871,231  1/1959  Straley et al. _____ 260—158 X
CHARLES B. PARKER, *Primary Examiner.*
D. M. PAPUGA, *Assistant Examiner.*

UNITED STATES PATENT OFFICE
CERTIFICATE OF CORRECTION

Patent No. 3,392,164                                      July 9, 1968

Hermann Wunderlich

It is certified that error appears in the above identified patent and that said Letters Patent are hereby corrected as shown below:

Column 2, line 18, "0-5 C." should read -- 0-5° C. --; line 46, "billing" should read -- boiling --. Column 4, lines 65 to 70, the portion of the formula reading

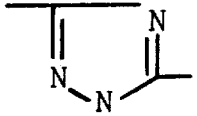   should read   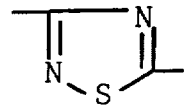

Signed and sealed this 13th day of January 1970.

(SEAL)
Attest:

Edward M. Fletcher, Jr.                         WILLIAM E. SCHUYLER, JR.
Attesting Officer                                     Commissioner of Patents